March 29, 1938. L. G. PONCE 2,112,656
UNIVERSAL MOUNTING
Filed June 30, 1936
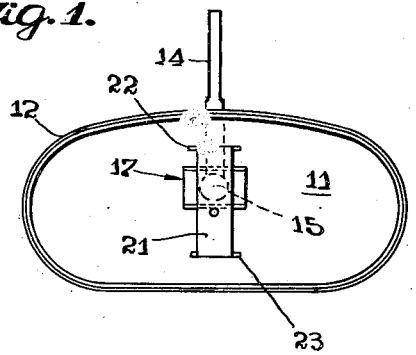
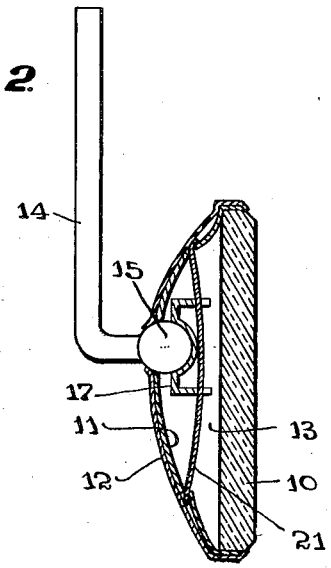
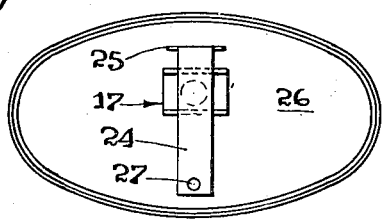
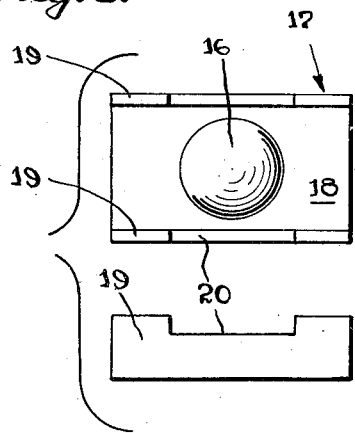
INVENTOR
LUCIEN G. PONCE
BY James C. Bradley
ATTORNEY Patented Mar. 29, 1938

2,112,656

UNITED STATES PATENT OFFICE 2,112,656

UNIVERSAL MOUNTING

Lucien G. Ponce, Follansbee, W. Va., assignor to Liberty Mirror Works, a corporation of Pennsylvania Application June 30, 1936, Serial No. 88,122

4 Claims. (Cl. 287—21)

The invention relates to a universal mounting adapted particularly for supporting a rear vision mirror casing to permit adjustment to different angles. The invention has for its objects the provision of a very simple housing and joint construction which is equally effective to hold the mirror against movement in all its positions of adjustment, which is very cheap and durable, and which is of such character that the appearance of the mirror from the back is not impaired by the presence of the joint. Certain embodiments of the invention are illustrated in the accompanying drawing, wherein:

Figure 1 is a front elevation of the device with the mirror glass removed. Fig. 2 is a vertical section through the complete assembly. Fig. 3 is a detail view of the saddle which engages one side of the stud ball. Fig. 4 is a view similar to that of Fig. 1 showing a modification.

Referring to Figs. 1, 2 and 3, the numeral 10 indicates the glass mirror plate provided on its rear face with a reflective coating protected in the usual way by suitable coatings and a paper sheet which, for clearness of illustration as to other parts, are not shown. Back of the mirror plate is a sheet metal reinforcing plate 11 having its edges fitting around the edges of the glass plate, as shown. Fitting over the reinforcing plate and having the same contour is the backing plate 12 which is of much lighter material than the reinforcing plate. This plate has its edges spun around the beveled edges of the glass sheet, thus holding the parts in assembled relation. The reinforcing and backing plates bulge outwardly, as shown in Fig. 2, thus providing a space 13 for the reception of the ball joint.

The assembly is supported from the stud 14 having a ball 15 at its end, such ball fitting on one side into a rounded seat formed in the reinforcing plate. The other side of the ball fits into a rounded seat 16 in a saddle 17 shown in detail in Fig. 3. The saddle comprises the plate 18, with the seat 16 therein and the flanges 19, 19, which are notched, as indicated at 20. Spring clamping force is applied to the saddle by means of the vertical leaf spring 21 which fits into the notches 20 in the saddle and has its ends secured in the reinforcing plate. The reinforcing plate is provided with a pair of horizontal slots 22 and 23 (Fig. 1) through which the ends of the spring 21 extend, such ends being slightly recurved as indicated in Fig. 2. The slots 22 and 23 are slightly longer than the width of the spring (Fig. 1), so that the spring has a limited lateral movement at its ends. This freedom of movement, I have found to be desirable, at least at one end of the spring, in order to permit the saddle to better adjust itself to the position of the ball and insure a more uniform bearing of the rounded seat 16 on the ball in case the parts are not exactly alined. This insures an exact coordination of the ball and its seats, since the saddle can adjust itself longitudinally of the leaf spring and the leaf spring can adjust itself in a direction at right angles to its longitudinal dimension. The ball joint is maintained in satisfactory condition much longer, if one end of the spring is free, so that it can change its position slightly as the seats or ball wear, which is important in a joint of the character here shown having no manual adjusting means. I have also found that the vertical position of the leaf spring is advantageous, as compared with a horizontal position, as the casing is stiffer transversely than longitudinally, so that any distortion of the casing incident to the use of the spring is reduced to a minimum.

In the form of device shown in Fig. 4, the leaf spring 24 fits at its upper end in a slot 25 in the reinforcing plate 26, but at its lower end is secured on a rivet 27 instead of engaging a slot as in the Fig. 1 device. This permits the spring to rock laterally and move endwise slightly so that the result achieved approximates that of the Fig. 1 construction.

What I claim is:

1. In combination in a universal mounting, a sheet metal plate adapted to act as a support, said plate being provided with a perforation surrounded on one side of the plate with a ball seat, a ball stud extending through the perforation and comprising a stem with a ball at its inner end which engages said seat, a leaf spring forward of the ball secured at its ends to the plate, and a ball saddle intermediate the spring and ball having a seat in opposition to the ball seat in the plate and supported on the spring for movement longitudinally thereof.

2. In combination in a universal mounting a sheet metal plate adapted to act as a support, said plate being provided with a perforation surrounded on one side of the plate with a ball seat, a ball stud extending through the perforation and comprising a stem with a ball at its inner end which engages said seat, a leaf spring forward of the ball secured at its ends to the plate with one of said ends having a limited amount of play relative to the casing transversely of the length of the spring in the plane of the leaf, and a ball saddle intermediate the spring and ball having a seat in opposition to the ball seat in the plate and supported on the spring for movement longitudinally thereof.

3. In combination in a universal mounting, a sheet metal plate adapted to act as a support, said plate being provided with a perforation surrounded on one side of the plate with a ball seat, a ball stud extending through the perforation and comprising a stem with a ball at its inner end which engages said seat, a leaf spring forward of the ball secured at its ends to the plate, and a ball saddle intermediate the spring and ball comprising a base plate provided with a seat engaging the ball and with a pair of flanges at its edges engaging the spring so that the saddle is slidable longitudinally thereof.

4. In combination in a universal mounting, a sheet metal plate adapted to act as a support, said plate being provided with a perforation surrounded on one side of the plate with a ball seat, a ball stud extending through the perforation and comprising a stem with a ball at its inner end which engages said seat, a leaf spring forward of the ball secured at its ends to the plate, and a ball saddle intermediate the spring and ball slidable longitudinally of the spring and comprising a base plate provided with a seat engaging the ball and with a pair of flanges at the edges of the plate which are engaged by the plate, such flanges being provided with notches to receive the spring.

LUCIEN G. PONCE.